Jan. 1, 1963 R. C. KOHRN ET AL 3,070,817
LAMINATED BOAT CONSTRUCTION MATERIAL
Filed March 20, 1958 3 Sheets-Sheet 1
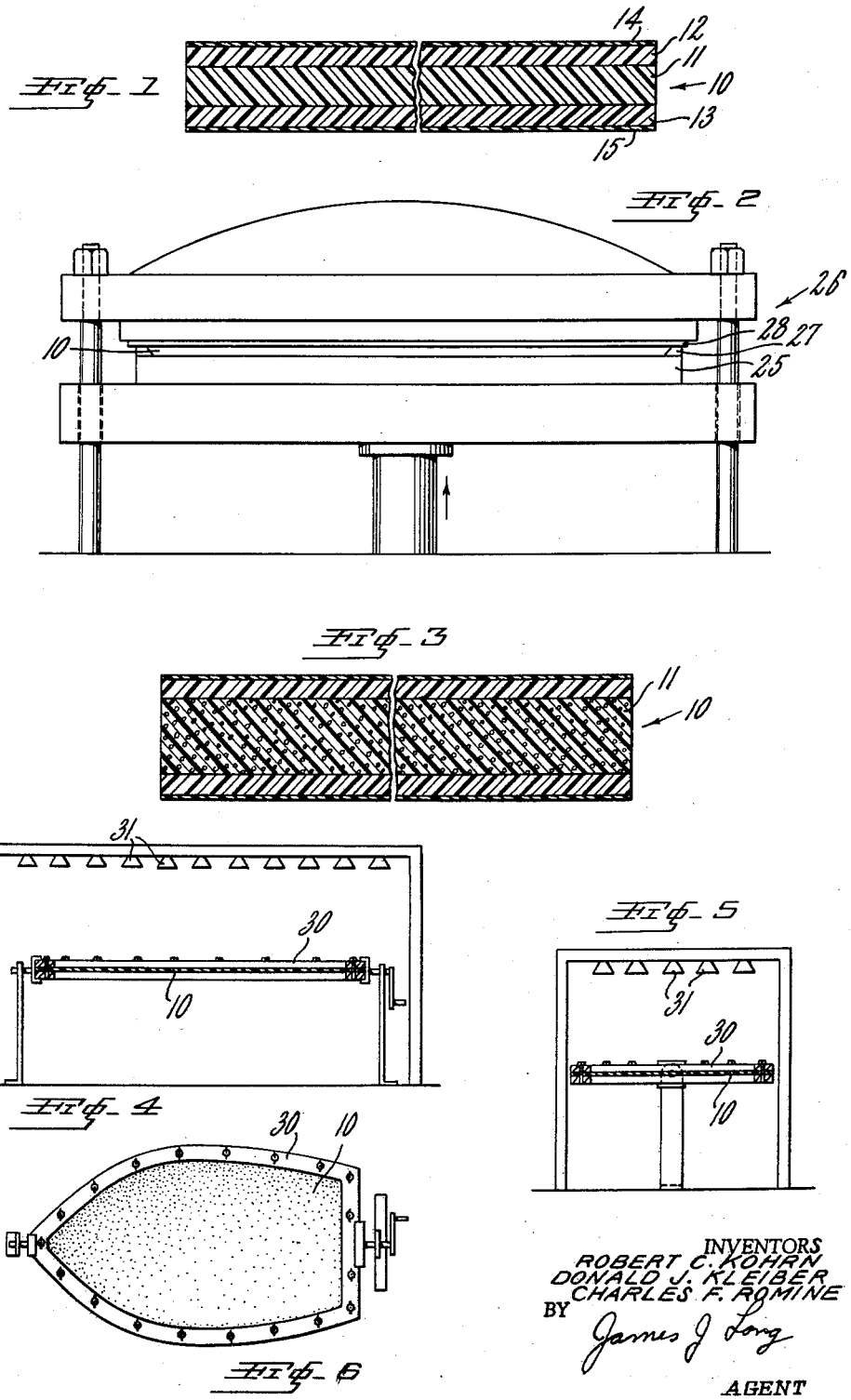
INVENTORS
ROBERT C. KOHRN
DONALD J. KLEIBER
CHARLES F. ROMINE
BY James J. Long
AGENT

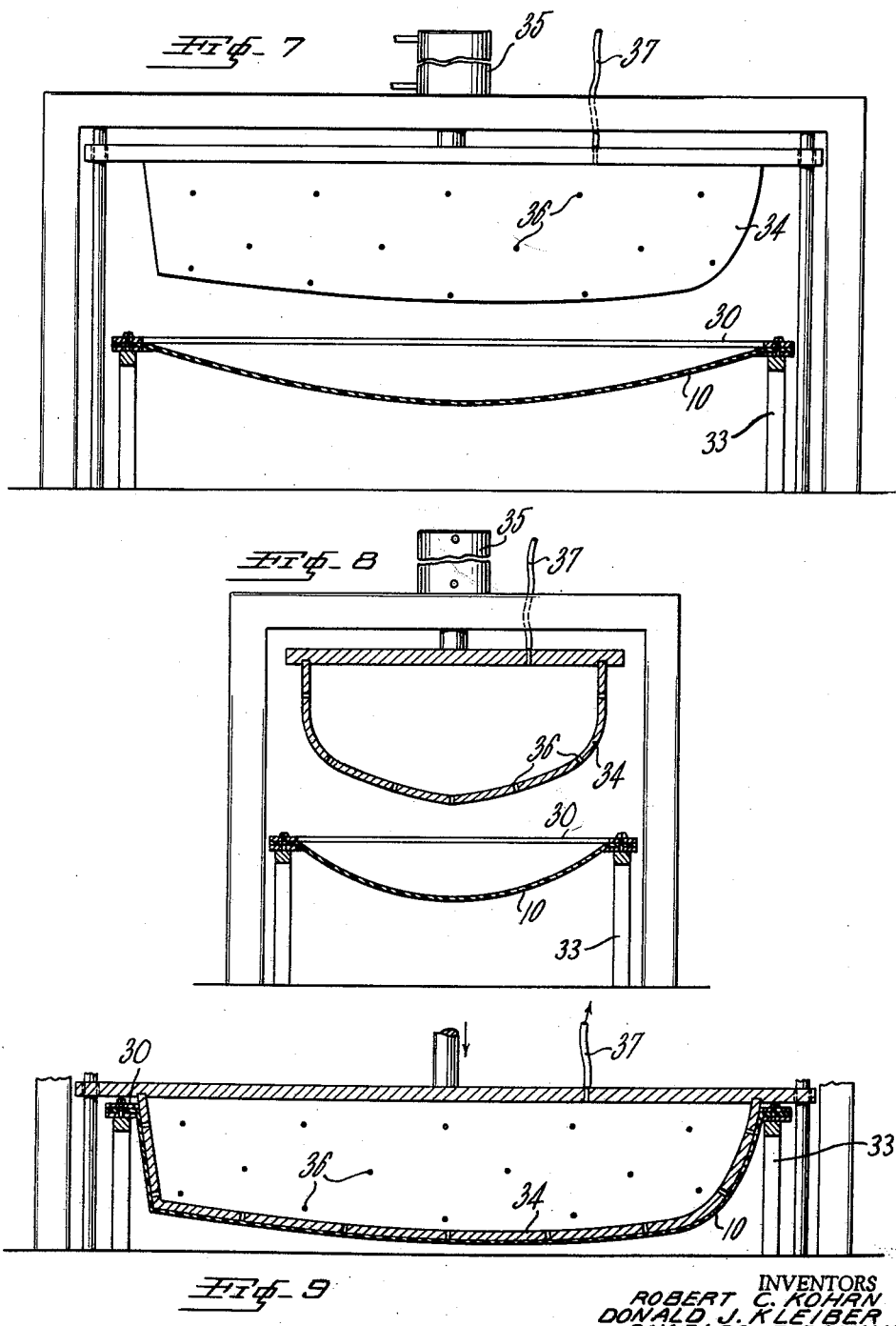

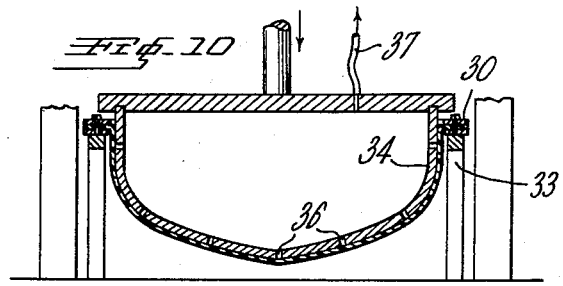
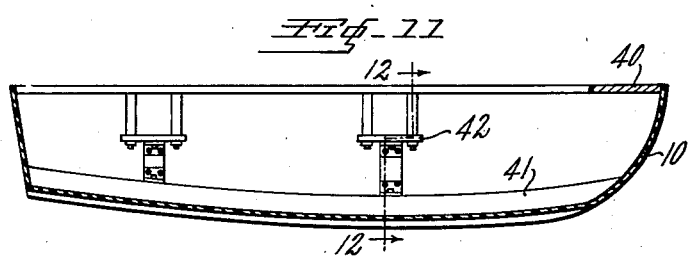
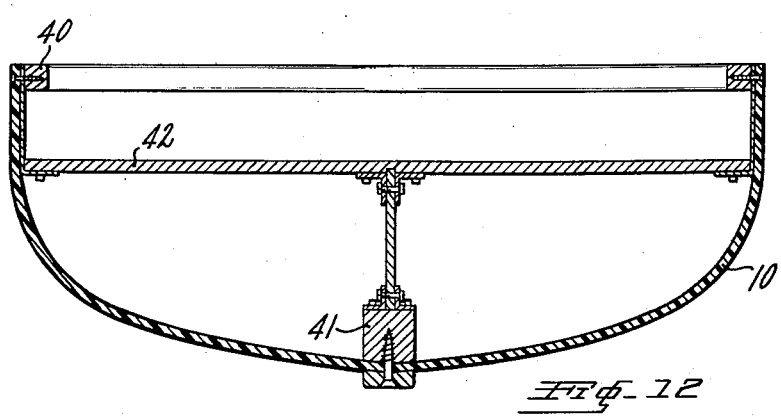
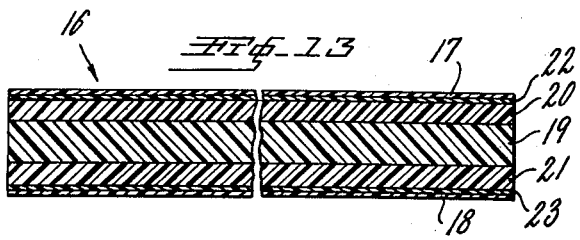

United States Patent Office 3,070,817
Patented Jan. 1, 1963

3,070,817
LAMINATED BOAT CONSTRUCTION MATERIAL
Robert C. Kohrn, Pawtucket, R.I., and Donald J. Kleiber, Chicago, and Charles F. Romine, Wheaton, Ill., assignors, to United States Rubber Company, New York, N.Y., a corporation of New Jersey
Filed Mar. 20, 1958, Ser. No. 722,814
11 Claims. (Cl. 9—6)

This invention relates to a boat and to a laminated material for making the same. More particularly it relates to a boat made of plastic material embodying integral flotation means in the hull, and to a heat-formable laminated rigid sheet material for fabricating such boat.

In accordance with the invention, there is first assembled a laminate comprising a core of expandable plastic material and outer sheets of non-expandable plastic material. Such laminate is heated to cause the plies to bond together and the core to expand. The laminate is then shaped into a boat hull while in a heated, highly plastic condition, with the aid of a form or forms having the shape of the desired hull.

The invention will be described in detail with reference to the accompanying drawings, wherein:

FIG. 1 is a cross-sectional view of a lay-up of plastic sheets suitable for use in the invention;

FIG. 2 is a similar view of the lay-up of FIG. 1, on a smaller scale, being heated in a press for the purpose of laminating and curing the sheets and simultaneously decomposing a blowing agent contained in the core sheet;

FIG. 3 is a view similar to FIG. 1, showing the laminate after removal from the press and after expansion of the core;

FIGS. 4 and 5 are, respectively, longitudinal and end views of the laminated sheet rotatably supported in a heating device;

FIG. 6 is a plan view of the laminate mounted in the rotatable support;

FIGS. 7 and 8 are, respectively, longitudinal and transverse views of the laminate in a heated condition in position within a shaping device preparatory to shaping;

FIGS. 9 and 10 are similar, respectively, to FIGS. 7 and 8, but show the laminate in contact with the shaping member to form a boat hull;

FIG. 11 is a longitudinal sectional view of the formed boat hull with certain structural members added to complete the boat;

FIG. 12 is a transverse sectional view, on a larger scale, of the boat of FIG. 11; and FIG. 13 is a view similar to FIG. 1, of a modified lay-up suitable for use in the invention.

The form of the invention described in detail involves an open dinghy, but it will be understood that other kinds of boats, having decking, cabins, bulkheads, or other desired provisions for strengthening the hull or affording shelter, may be made by essentially the same method. Such decking and other members may be made of the same material as the hull by the method to be described, or they may be made of any other suitable desired material.

Referring to the drawings, FIG. 1 shows a lay-up or laminate 10 comprising an inner core 11 of a curable or vulcanizable plastic material, preferably a mixture of a major proportion of a hard, plastic material (such as styrene-acrylonitrile resin, with or without polyvinyl chloride resin) and a minor proportion of a rubbery material compatible therewith (such as butadiene-acrylonitrile rubber, with or without small amounts of other rubbery materials such as polybutadiene, butadiene-styrene rubber or natural rubber). The core 11 contains curatives or vulcanizing agents (such as sulfur, preferably along with an accelerator) which act on the rubbery constituent of the core and cause it to be converted by heat into a strong, solvent-resistant, substance. The core composition further includes a blowing agent, that is, a substance capable of turning into a gas or vapor or generating a gas or vapor at elevated temperature, thus forming a large number of small pores or cells in the body of the core, so that the effective density of the core is very must reduced, and the core is thus rendered extremely buoyant. Any suitable blowing agent (of which there are many described, for example, in Modern Plastics Encyclopedia Issue, 1956, at pages 351-2) may be used. The composition from which the core is made may be mixed in conventional rubber or plastic mixing machinery in accordance with conventional practice and may be formed into a sheet 11 by any suitable method, such as calendering. Particularly preferred gum plastic blends are those based on a minor proportion (e.g. 10 to 49 parts) of a rubber such as butadiene-acrylonitrile copolymer rubber and a major proportion (e.g. 90 to 51 parts) of a resin such as styrene-acrylonitrile resin or mixtures of styrene-acrylonitrile resin with a vinyl chloride resin such as polyvinyl chloride or the like (in ratio of, for example, 10 parts of styrene-acrylonitrile resin to 1 to 10 parts of polyvinyl chloride). A specific example of a suitable formulation for the core is as follows:

Core

| | Parts |
|---|---|
| Styrene-acrylonitrile resin | 70 |
| Butadiene-acrylonitrile rubber | 25 |
| Plasticizer | 5 |
| Antioxidant | 3.1 |
| Stearic acid | 1 |
| Zinc oxide | 3 |
| Benzothiazyl disulfide | 0.5 |
| Sulfur | 1.6 |
| Blowing agent | 15 |

Any suitable conventional plasticizer (such as the liquid butadiene-acrylonitrile copolymer sold under the trade name "Hycar 1312") may be used, as may any suitable conventional antioxidant (such as the diphenylamine-acetone condensation product known as "BLE"). As will be understood by those skilled in the art of compounding rubber and plastics, other vulcanizing ingredients than those shown may be used. Any suitable conventional blowing agent (such as p,p'-oxybis(benzenesulfonyl hydrazide)) may be used. The proportions of the various ingredients are in general not critical, and may be suitably varied as desired. For a small boat, the thickness of the core sheet might typically be about 0.1″ (before expansion).

On each side of the core layer 11 there are substrate layers 12, 13 that are usually less thick (they might, for example, have a thickness of about 0.05″ for a small boat) than the core. The substrate layers may be fabricated from essentially the same ingredients as the core (except that no blowing agent is included) and their function is to provide protection and strength for the core. An example of a suitable formulation is as follows:

Substrate

| | Parts |
|---|---|
| Styrene-acrylonitrile resin | 59.5 |
| Butadiene-acrylonitrile rubber | 21.3 |
| Plasticizer (as for the core, above) | 4.2 |
| Antioxidant (as for the core, above) | 2.6 |
| Stearic acid | 0.8 |
| Zinc oxide | 2.5 |
| Benzothiazyl disulfide | 0.4 |
| Sulfur | 1.15 |
| Polyvinyl chloride | 15 |
| Plasticizer for polyvinyl chloride (e.g. dioctyl phthalate) | 1.8 |
| Calcium stearate | 0.15 |
| Stabilizer for polyvinyl chloride (e.g. cadmium stearate) | 0.5 |
| Colored pigments | As desired |

Again, other suitable compounding ingredients may be substituted for those shown, in any appropriate desired amounts to confer specific properties of strength, flexibility, stiffness, color etc.

To the outer side of each substrate layer there are applied skin layers 14, 15, having a thickness of, for example, 0.015", composed of a flexible, adherent material that is highly resistant to ultra-violet light, to oxidation, abrasion, ozone, and to weathering. The skin can be prepared in bright colors. Such skin layers are preferably comprised in large part of an elastomeric material having little or no unsaturation, such as chlorosulfonated polyethylene, butyl rubber (butyl rubber may be regarded as a substantially saturated rubber for the present purpose), polyisobutylene, polychloroprene, etc. Preferred compositions for the skin layers are based on approximately equal parts of chlorosulfonated polyethylene and butadiene-acrylonitrile rubber (or 20–80 parts of chlorosulfonated polyethylene in correspondingly 80–20 parts of the nitrile rubber). An example of one suitable formulation is as follows:

Skin

| | Parts |
|---|---|
| Chlorosulfonated polyethylene elastomer | 50 |
| Butadiene-acrylonitrile rubber | 50 |
| Polyethylene | 1.5 |
| Hydrogenated rosin | 1.25 |
| Stearic acid | 0.5 |
| Magnesia | 5.0 |
| Zinc oxide | 1.5 |
| Titanium dioxide pigment | 40.0 |
| Silica filler | 15.0 |
| Hydrocarbon oil softener | 1.25 |
| Sulfur | 0.75 |
| Benzothiazyl disulfide | 0.25 |
| Dipentamethylene thiuram tetrasulfide | 0.375 |
| Colored pigments | As desired |

In the above examples, thermosetting resins, such as phenolic resins, may supplement or partially replace the thermoplastic resins (styrene-acrylonitrile resin, polyvinyl chloride resin) employed. Other conventional rubber-resin mixtures, such as those disclosed in French Patent 1,134,141, issued July 19, 1955, may be employed. The skin material must adhere firmly to the underlying layer, and nitrile rubber is included for this reason in the preferred skin.

In place of the lay-up 10 there may be employed a modified lay-up 16 (FIG. 13) in which there are applied to the outer surfaces of the lay-up additional layers of skin 17, 18 consisting essentially of a substantially saturated elastomer so that it is even more resistant to ultra-violet light, such as chlorosulfonated polyethylene, compounded for vulcanization in accordance with conventional practice. The core 19, substrates 20, 21 and intermediate skins 22, 23 of the lay-up 16 may be formulated in the same manner as the corresponding layers of the lay-up 10. The modified lay-up provides a laminate that is unusually resistant to ultra-violet light.

It will be understood that any given layer of the lay-up may in fact be composed of several plied-up sheets, instead of being a single sheet as shown in the drawing for clarity.

The lay-up is somewhat greater in length and width than the desired length and beam of the boat. The lay-up is placed on a lower platen 25 in a conventional heated press 26, within a confining ring 27 extending around the periphery of the lay-up. A cover plate 28 resting on the upper surface of the lay-up and of the ring serves to complete a closed mold cavity for the lay-up. The lay-up is heated under pressure to cause adhesion of the various layers to each other, thereby forming an integral laminate. Instead of curing the laminate in a press, it may be heated under pressure in a vulcanizer or autoclave, for example in an atmosphere of open steam. The heating is carried out for a time and temperature sufficient to bond together the plies and to cure the rubbery constituents of the laminate substantially completely, and sufficient to decompose the blowing agent in the core. Because the laminate is maintained under pressure at this stage the core does not blow or expand a great deal, but the gas generated by decomposition of the blowing agent simply remains in solution or as compressed bubbles within the core composition. Pressures on order of 200 p.s.i. will prevent substantial increase in thickness during the cure. It is preferred to use a pressure of about 65 p.s.i. to obtain some expansion in thickness during the cure. With the particular compositions exemplified above, heating at a temperature of about 300° F. for a period of about 30 minutes gives satisfactory results, although other suitable temperatures, pressures, and times may of course be used, as will be understood by those skilled in the rubber and plastics arts. If the laminate is cured against a grained surface, the grain will remain through the subsequent forming operation to give an attractive surface.

The press is opened or vulcanizer pressure reduced while the laminate is still hot, whereupon the gas previously generated by the blowing agent expands the core of the laminate to much more than its original thickness, as shown in FIG. 3. This new cellular core 11 typically has a density of only about 15 pounds per cubic foot. Expansion occurs substantially only in the direction of thickness of the core, because the length and width of the laminate are essentially fixed by the now integral and vulcanized outer layers of the laminate. The composition of the core, that is, the relative proportions of rubbery and thermoplastic materials, and the kind and quantity of vulcanizing agents for the rubbery constituent, as well as the conditions of heating in the press, are such that the core is able to expand while it is in a heated condition, even though it has been previously vulcanized. In other words, the composition and processing of the core are such that it still retains a certain amount of thermoplasticity, even though it has enough strength (by reason of the vulcanized rubbery component therein) to retain the gas in predominantly closed cells under the conditions of the expansion. In the composition illustrated proper expansion is obtained when the curing agent (sulfur) amounts to from about 0.25 to about 1.5 parts (per 100 parts of rubber plus resin). The preferred overall density of the laminate is about 30 pounds per cubic foot.

The thus-expanded laminate may then be cut to the approximate vertically projected profile of the boat (if this has not been done previously) and bolted into a frame 30 (FIGS. 4, 5, and 6) having such outline. The frame 30 is rotatably supported below a bank of radiant heaters 31. The frame is slowly rotated while heating the laminate to a temperature (e.g. about 300° F.) such that it is readily deformable and begins to sag of its own weight (as illustrated in FIGS. 7 and 8). Such rotation insures uniform heating throughout the entire thickness of the laminate, and makes it possible to carry out properly the now to be described forming operation.

The frame 30, bearing the soft, deformable heated laminate 10 is now transferred to a stand 33 disposed below a male mold 34 having the shape of the interior surface of the boat hull, and adapted to be raised or lowered at will with the aid of an hydraulic cylinder 35 or equivalent conventional means. To aid in the forming operation the surface of the mold is provided with holes 36 which communicate, through the hollow interior of the mold, with a flexible connection 37 to a source of vacuum (not shown). The mold is caused to descend slowly onto the soft, thermoplastic laminate, while applying vacuum, thus causing the laminate to be drawn uniformly into the shape of the mold, as shown in FIGS. 9 and 10. By employing the compositions and procedure described it is possible to thus vacuum draw or mold the laminate into the compound curved shape of a boat hull uniformly without undesired distortion or local thinning out of the laminate. The shaped hull soon becomes cool and rigid enough to hold its shape whereupon it is removed, trimmed, and any desired parts are added to complete the boat (as shown in FIGS. 11 and 12) such as wooden gunwales 40, keel 41, seats 42, etc.

Many advantages of the invention will be evident to those skilled in the art. The boat is safe and of high quality, and has eminent serviceability and long lasting attractive appearance. The boat withstands weather, ultraviolet light and atmospheric gases, and retains its strength under all normal conditions of exposure to heat and cold. It is not adversely affected by humidity, nor by continuous or discontinuous salt or fresh water immersion. It withstands abrasion (wet or dry), flexing, vibration, and fatigue. It is impact resistant, withstands heavy weight loads, as well as pounding and shock. It is not harmed by gasoline spillage, nor by oil spillage or oil pickup from contaminated water. It withstands marine worms, marine growth, as well as dry or damp rot, mildew, fungus and bacteria. Difficulties from shrinking or swelling are absent.

The hull of the present boat may be made seamless, and it is self-buoyant even when punctured because of the cellular nature of the core. The method of making the boat is convenient and economical, and leads to a well-shaped boat with a minimum of manipulation.

Having thus described our invention, what we claim and desire to protect by Letters Patent is:

1. A boat comprising a rigid laminate having the shape of a boat hull, said laminate being an integral seamless unit forming the entire bottom and sides of the boat, the said laminate having an integral core member which is a single sheet extending throughout the entire bottom and sides of the boat, said core being a closed-cell expanded blend of a major proportion of a thermoplastic resinous material and a minor proportion of a rubbery material compatible therewith, each face of said core sheet being completely covered by an overlying integrally united layer which is relatively thin in comparison to said core sheet and which is a continuous, solid, impervious material that is also a blend of a major proportion of the said resinous material and a minor proportion of the said rubbery material, the rubbery material of the said core and overlying layers being vulcanized.

2. A boat comprising a rigid laminate having the shape of a boat hull, said laminate being an integral seamless unit forming the entire bottom and sides of the boat, the said laminate having an internal core member which is a single sheet extending throughout the entire bottom and sides of the boat, said core being a closed-cell expanded blend of (A) a major proportion of a thermoplastic resin selected from the group consisting of styrene-acrylonitrile copolymer resin and mixtures of styrene-acrylonitrile resin with polyvinyl chloride resin with (B) a minor proportion of a rubbery butadiene-acrylonitrile copolymer, each face of said core sheet being completely covered by an overlying, integrally united layer which is relatively thin in comparison to said core sheet and which is a continuous, solid, impervious material that is also a blend of a major proportion of the said resin A and a minor proportion of the said rubbery copolymer B.

3. A boat as in claim 2, in which the outer surface of each said overlying solid layer is covered by an integrally united continuous protective skin layer comprising a mixture of 20–80 parts of chlorosulfonated polyethylene elastomer and correspondingly 80–20 parts of butadiene-acrylonitrile rubber 4. A boat as in claim 2, in which the said core sheet contains from 0.25 to 1.5 parts of sulfur per 100 parts of said resin A and rubbery copolymer B.

5. A boat as in claim 2 in which the outer surface of each said overlying solid layer is covered by an integrally united additional continuous layer which is a blend of chlorosulfonated polyethylene elastomer and butadiene-acrylonitrile rubber, and in which each outer face of each such additional layer is covered by an integrally united protective skin comprised of chlorosulfonated polyethylene elastomer.

6. A boat hull comprising a single, rigid, self-buoyant, heat-formable, laminated, plastic sheet material in the shape of a boat hull and being an integral seamless unit constituting the entire bottom and sides of the boat hull, said laminated sheet having an integral, rigid, cellular, plastic core member which is coextensive with the entire structure, each face of said core being covered by an over-lying solid rigid plastic layer integrally united with said rigid cellular plastic core.

7. A boat hull as in claim 6 in which the said overlying rigid plastic layer is made of a mixture of a major proportion of a thermoplastic resinous material and a minor proportion of a rubbery material.

8. A boat hull as in claim 6 in which the said cellular core is made of a mixture of a major proportion of a thermoplastic resinous material and a minor proportion of a rubbery material.

9. A boat hull as in claim 6 in which the said cellular core is made of a mixture of a major proportion of a thermoplastic resinous material with a minor proportion of a rubbery material, and in which said over-lying rigid plastic layer is made of a mixture of a major proportion of a thermoplastic resinous material with a minor proportion of a rubbery material.

10. A boat deck comprising a single, rigid, self-buoyant, heat-formable, laminated, plastic sheet material in the shape of a boat deck and being an integral seamless unit, said laminated sheet having an integral, rigid, cellular, plastic core member which is coextensive with the entire structure, each face of said core being covered by an over-lying solid rigid plastic layer integrally united with said rigid cellular plastic core.

11. A heat-formable laminated rigid sheet material comprising a core layer in the form of a relatively thick sheet which is an expanded closed-cell cellular material comprising a mixture of a major proportion of a thermoplastic resinous material and a minor proportion of a rubbery material, each face of said core layer being integrally united to a solid outer covering layer devoid of cells, said covering layer being totally impervious and being of substantial thickness but thinner than said core layer and forming a definite layer which is distinct from said core, said covering layer comprising a mixture of a major proportion of a thermoplastic resinous material and a minor proportion of a rubbery material.

(References on following page)

References Cited in the file of this patent

UNITED STATES PATENTS

| | | |
|---|---|---|
| 2,467,322 | Lightbown et al. | Apr. 12, 1949 |
| 2,575,378 | Bender | Nov. 20, 1951 |
| 2,617,126 | Nebesar | Nov. 11, 1952 |
| 2,660,194 | Hoffman | Nov. 24, 1953 |
| 2,660,761 | Peters | Dec. 1, 1953 |
| 2,724,676 | Randall et al. | Nov. 22, 1955 |
| 2,767,436 | Noland et al. | Oct. 23, 1956 |
| 2,772,196 | Pooley | Nov. 27, 1956 |
| 2,807,811 | Atkinson et al. | Oct. 1, 1957 |
| 2,815,309 | De Ganahl et al. | Dec. 3, 1957 |
| 2,825,661 | Dosmann | Mar. 4, 1958 |
| 2,854,425 | Boger et al. | Sept. 30, 1958 |
| 2,863,797 | Meyer | Dec. 9, 1958 |

FOREIGN PATENTS

| | | |
|---|---|---|
| 924,675 | Germany | Mar. 7, 1955 |